(12) United States Patent
Fukawatase et al.

(10) Patent No.: US 9,004,526 B2
(45) Date of Patent: Apr. 14, 2015

(54) VEHICULAR PASSIVE SAFETY DEVICE

(71) Applicants: Osamu Fukawatase, Miyoshi (JP); Daisaku Ito, Toyokawa (JP)

(72) Inventors: Osamu Fukawatase, Miyoshi (JP); Daisaku Ito, Toyokawa (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 14/044,256

(22) Filed: Oct. 2, 2013

(65) Prior Publication Data

US 2014/0097601 A1    Apr. 10, 2014

(30) Foreign Application Priority Data

Oct. 9, 2012   (JP) .................................. 2012-224507

(51) Int. Cl.
*B60R 21/231*  (2011.01)
*B60R 21/207*  (2006.01)
*B60R 21/214*  (2011.01)

(52) U.S. Cl.
CPC ............. *B60R 21/214* (2013.01); *B60R 21/207* (2013.01); *B60R 21/231* (2013.01); *B60R 2021/23107* (2013.01); *B60R 2021/23146* (2013.01); *B60R 2021/23161* (2013.01); *B60R 2021/23192* (2013.01)

(58) Field of Classification Search
CPC ................... B60R 21/231; B60R 2021/23107; B60R 21/214; B60R 2021/23146; B60R 2021/23161; B60R 2021/23192
USPC .............................................. 280/729, 730.1
See application file for complete search history.

(56) References Cited

U.S. PATENT DOCUMENTS

| | | | | |
|---|---|---|---|---|
| 5,470,103 A | * | 11/1995 | Vaillancourt et al. | 280/730.1 |
| 5,499,840 A | * | 3/1996 | Nakano | 280/730.1 |
| 6,966,576 B1 | * | 11/2005 | Greenstein | 280/730.1 |
| 8,702,122 B2 | * | 4/2014 | Tomitaka et al. | 280/730.2 |
| 2004/0183285 A1 | | 9/2004 | Nishikaji et al. | |
| 2007/0096444 A1 | * | 5/2007 | Bostrom et al. | 280/730.2 |
| 2007/0267854 A1 | | 11/2007 | Fukuda et al. | |
| 2009/0160166 A1 | | 6/2009 | Kataoka et al. | |
| 2010/0314859 A1 | * | 12/2010 | Tomitaka et al. | 280/730.2 |
| 2012/0091697 A1 | | 4/2012 | Wiik et al. | |
| 2013/0197764 A1 | * | 8/2013 | Thomas | 701/45 |

FOREIGN PATENT DOCUMENTS

| | | | |
|---|---|---|---|
| DE | 10 2007 051282 A1 | * | 4/2009 |
| JP | A-2004-249831 | | 9/2004 |
| JP | A-2007-223525 | | 9/2007 |
| JP | A-2009-149196 | | 7/2009 |

(Continued)

*Primary Examiner* — Ruth Ilan
(74) *Attorney, Agent, or Firm* — Oliff PLC

(57) ABSTRACT

A vehicular passive safety device includes a vehicular seat, a far-side airbag device, and a roof airbag device. The vehicular seat has a seat cushion and a seat back. In the far-side airbag device, a far-side airbag that is accommodated in a lateral portion of the seat back located inside in a vehicle width direction is supplied with a gas from a far-side inflator, and is expanded and deployed forward of the lateral portion with respect to a vehicle. In the roof airbag device, a roof airbag that is accommodated in a ceiling portion of a vehicle body is supplied with a gas from a roof inflator, and is expanded and deployed downward of the ceiling portion, and the expanded and deployed roof airbag abuts on or faces an upper portion of the expanded and deployed far-side airbag from inside in the vehicle width direction.

12 Claims, 6 Drawing Sheets

(56) References Cited

FOREIGN PATENT DOCUMENTS

| | | |
|---|---|---|
| JP | A-2009-154709 | 7/2009 |
| JP | A-2010-52619 | 3/2010 |
| JP | A-2010-143232 | 7/2010 |
| JP | A-2012-081958 | 4/2012 |
| JP | A-2012-131503 | 7/2012 |
| WO | WO 2012/060574 * | 5/2012 |

* cited by examiner

VEHICULAR PASSIVE SAFETY DEVICE

INCORPORATION BY REFERENCE

The disclosure of Japanese Patent Application No. 2012-224507 filed on Oct. 9, 2012 including the specification, drawings and abstract is incorporated herein by reference in its entirety.

BACKGROUND OF THE INVENTION

1. Field of the Invention

The invention relates to a vehicular passive safety device that restrains an occupant seated in a vehicular seat from inside in a vehicle width direction by a far-side airbag in the event of a side collision.

2. Description of Related Art

In Japanese Patent Application Publication No. 2007-223525 (JP-2007-223525 A), there is described a passive safety device in which a far-side airbag that is expanded and deployed between an occupant seated in a right seat and an occupant seated in a left seat is accommodated in a ceiling portion of a vehicle in a folded state.

Besides, in Japanese Patent Application Publication No. 2010-52619 (JP-2010-52619 A), there is described an airbag device in which a far-side airbag that is expanded and deployed between an occupant seated in a right seat and an occupant seated in a left seat is accommodated in a folded state in an accommodation space for a center console box or in an accommodation container provided behind the space.

However, in each of the aforementioned respective devices, with a view to enhancing the occupant restraint performance of the far-side airbag that is expanded and deployed from the ceiling portion of the vehicle or the center console box, it is necessary to increase the up-down dimension of the far-side airbag in an expanded and deployed state, and widen the face for restraining the occupants. Thus, the far-side airbag is enlarged in capacity, so that it is difficult to secure a space in which the far-side airbag is accommodated. In particular, in the airbag device described in the aforementioned Japanese Patent Application Publication No. 2010-52619 (JP-2010-52619 A), since the far-side airbag is accommodated in the center console box, the accommodation capacity of the center console box is greatly restricted.

SUMMARY OF THE INVENTION

The invention provides a vehicular passive safety device that can make it easy to secure a space in which a far-side airbag is accommodated.

A first aspect of the invention relates to a vehicular passive safety device. The vehicular passive safety device is equipped with a vehicular seat, a far-side airbag device, and a roof airbag device. The vehicular seat has a seat cushion and a seat back. In the far-side airbag device, a far-side airbag that is accommodated in a lateral portion of the seat back located inside in a vehicle width direction is supplied with a gas from a far-side inflator upon detection or prognosis of a side collision, and is expanded and deployed forward of the lateral portion with respect to a vehicle. In the roof airbag device, a roof airbag that is accommodated in a ceiling portion of a vehicle body is supplied with a gas from a roof inflator upon detection or prognosis of a side collision, and is expanded and deployed downward of the ceiling portion, and the expanded and deployed roof airbag abuts on or faces an upper portion of the expanded and deployed far-side airbag from inside in the vehicle width direction.

BRIEF DESCRIPTION OF THE DRAWINGS

Features, advantages, and technical and industrial significance of an exemplary embodiment of the invention will be described below with reference to the accompanying drawings, in which like numerals denote like elements, and wherein.

DETAILED DESCRIPTION OF EMBODIMENT

A vehicular passive safety device 10 according to the embodiment of the invention will be described hereinafter using FIGS. 1 to 6. Incidentally, arrows FR, UP, and IN depicted in the respective drawings in an appropriate manner denote a forward direction (a traveling direction), an upward direction, and an inside of a vehicle width direction of a vehicle respectively. Hereinafter, in the case where a description will be given simply using a longitudinal direction and a up-down direction, the front and back in the longitudinal direction of the vehicle, and the up and down of the up-down direction of the vehicle are meant, unless otherwise specified.

(Configuration)

Figure 1:
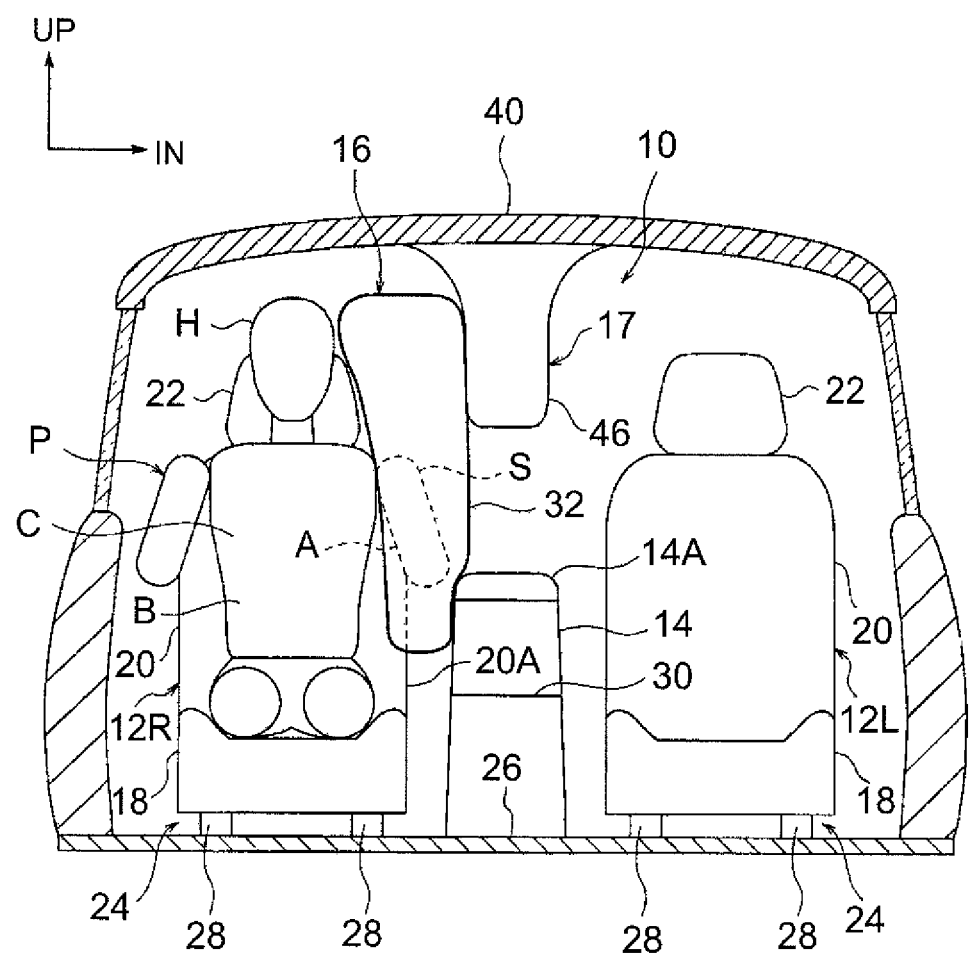
FIG. 1 is a front view showing a configuration of a vehicular passive safety device according to the embodiment of the invention, and representing a state in which a far-side airbag and a roof airbag are expanded and deployed as viewed from a front face side of a vehicle.

As shown in FIG. 1, the vehicular passive safety device 10 according to this embodiment of the invention is constituted of a vehicular seat 12R (a driver seat of a right-hand-drive vehicle in this case), a center console box 14 that is provided inside the vehicular seat 12R in a vehicle width direction, a far-side airbag device 16, and a roof airbag device 17.

The vehicular seat 12R is equipped with a seat cushion 18 on which an occupant P is seated, a seat back 20 that is coupled to a rear end of the seat cushion 18 to serve as a backrest of the occupant P, and a headrest 22 that is coupled to an upper end of the seat back 20 to support a head H of the occupant P.

The seat cushion 18 is coupled to a vehicle body floor portion 26 via a seat slide mechanism 24 (a longitudinal position adjustment mechanism). This seat slide mechanism 24 is equipped with a pair of right and left slide rails 28 that slidably couple the seat cushion 18 to the vehicle body floor portion 26 in a longitudinal direction of the vehicle, and a lock mechanism (not shown) that locks a slide of the seat cushion 18. By unlocking the locking by the lock mechanism, the longitudinal position of the vehicular seat 12R with respect to the vehicle body floor portion 26 can be adjusted.

Figure 5:
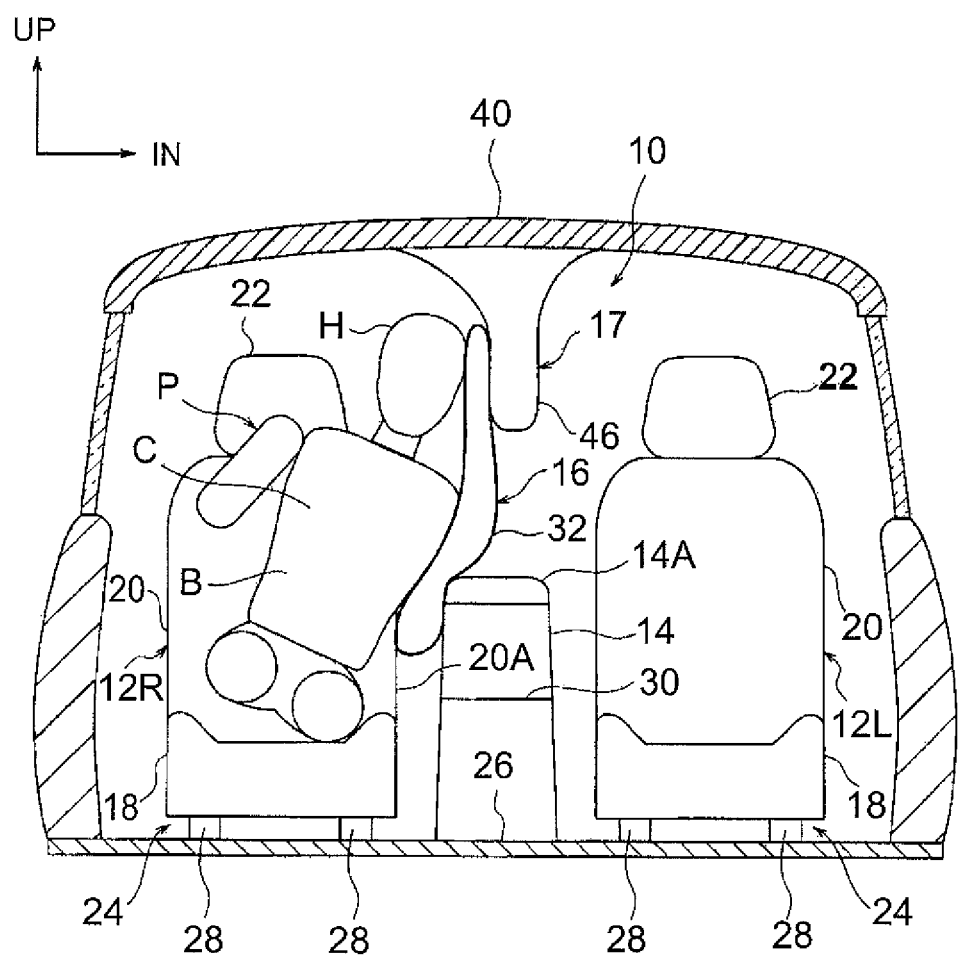
FIG. 5 is a front view corresponding to FIG. 1 and showing a state in which an occupant is restrained by the far-side airbag with which the vehicular passive safety device according to the embodiment of the invention is equipped.
Figure 6:
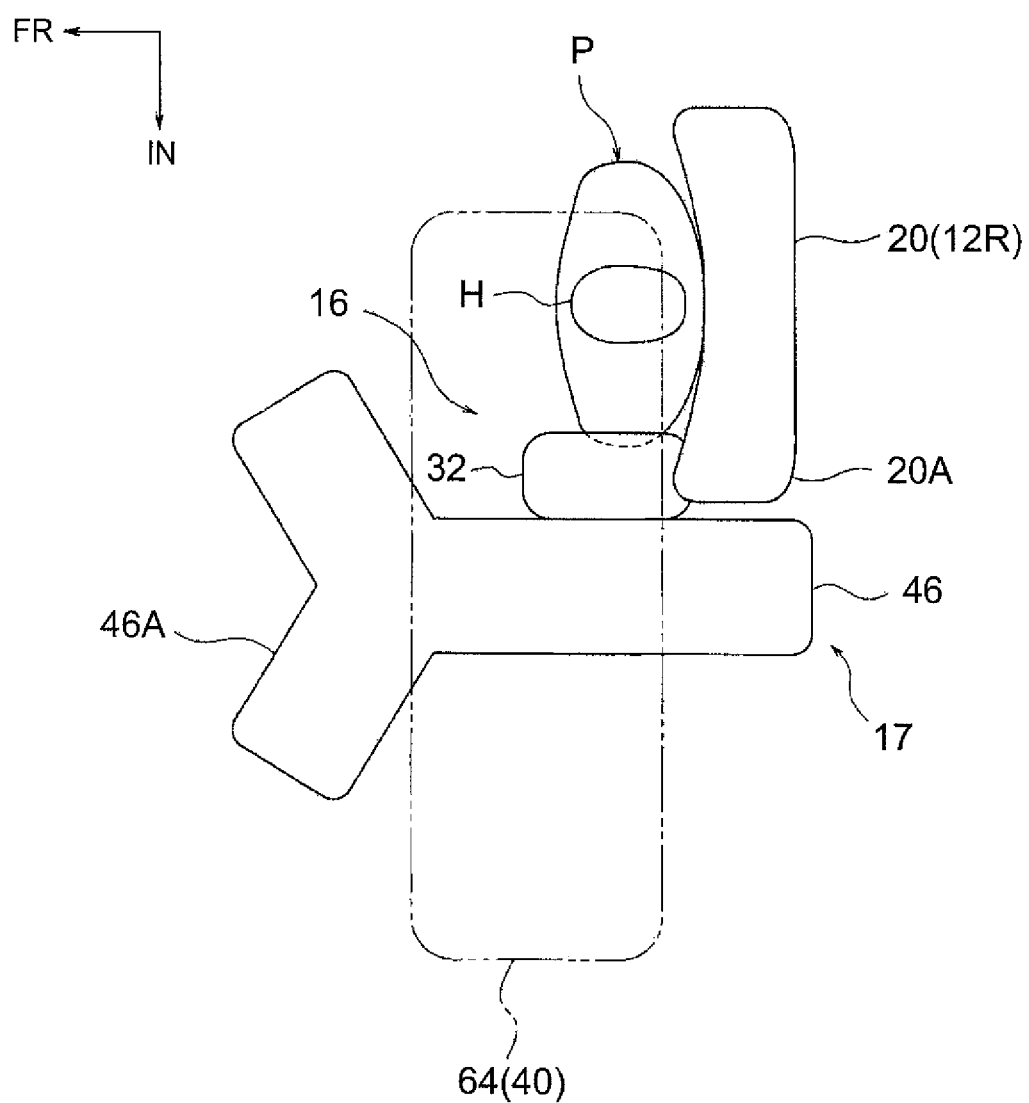
FIG. 6 is a plan view showing a modification example of the roof airbag according to the embodiment of the invention.

Incidentally, in this embodiment of the invention, the longitudinal direction, lateral direction (width direction) and up-down direction of the vehicular seat 12R coincide with the longitudinal direction, lateral direction (width direction) and up-down direction of the vehicle respectively. Besides, a vehicular seat 12L shown in FIGS. 1 and 5 is a front passenger seat. This vehicular seat 12L is basically identical in configuration to the vehicular seat 12R (like components are denoted by like reference symbols respectively). Besides, in FIGS. 1, 2 and 5, a dummy P for collision tests is seated in the vehicular seat 12R instead of an actual occupant. This dummy P is, for example, a World Side Impact Dummy (World SID). For the convenience of explanation, the dummy P will be referred to hereinafter as "the occupant P".

The center console box 14 (which will be referred to hereinafter as the console box 14) is provided inside the vehicular seat 12R in the vehicle width direction. That is, the console box 14 is disposed at a central portion in a vehicle interior in the vehicle width direction, between the vehicular seat 12R and the vehicular seat 12L. This console box 14 is provided integrally with a rear portion of a center console 30 that is fixed to an upper face of the vehicle body floor portion 26. An upper lid 14A that can be opened/closed is provided at an upper end of this console box 14. By opening the upper lid 14A, the interior of the console box 14 is opened. This upper lid 14A is also endowed with a function of an armrest portion that supports an arm portion A of the occupant P located inside in the vehicle width direction.

On the other hand, the far-side airbag device 16 shown in FIG. 1 is a device for mainly protecting an occupant on the other side of a collision side in the event of a side collision of the vehicle. This far-side airbag device 16 is equipped with a far-side airbag 32 that is disposed in a lateral portion 20A of the seat back 20 located inside in the vehicle width direction, and an inflator 34 (a far-side inflator: see FIGS. 2 and 3) that ejects a gas in the far-side airbag 32.

The far-side airbag 32 is modulized (unitized) together with the inflator 34, and is accommodated inside the lateral portion 20A in a folded state. This far-side airbag 32 is expanded and deployed forward of the lateral portion 20A with respect to the vehicle (inward of the occupant P in the vehicle width direction) due to a pressure of the gas supplied from the inflator 34 (in a state shown in FIG. 1). Incidentally, when the far-side airbag 32 is expanded and deployed, a sutured portion of a skin material of the seat back 20 (not shown) and a pad material of the seat back 20 (not shown) receive an expansion pressure of the far-side airbag 32 to be torn open.

This far-side airbag 32 is formed by folding a single foundation cloth, which is formed by cutting out, for example, a nylon-type cloth or a polyester-type cloth, into two and sewing an outer peripheral edge portion of the cloth. This far-side airbag 32 is formed in such a manner as to assume a substantially rectangular shape with a long length (a substantially oval shape) along the up-down direction of the vehicle, when an expanded and deployed state is viewed from the vehicle width direction. An upper portion of the far-side airbag 32 is located inside the head of the occupant P seated in the vehicular seat 12R in the vehicle width direction, in an expanded and deployed state. This far-side airbag 32 is formed in such a shape as to be able to restrain at least a head H, a shoulder S, a chest C and a belly B of the occupant P in an expanded and deployed state. When the far-side airbag 32 is in an expanded and deployed state, the console box 14 abuts on or faces a lower portion of the far-side airbag 32 from inside in the vehicle width direction, and the lower portion of the far-side airbag 32 is interposed between the console box 14 and the belly B of the occupant P.

Incidentally, the invention is not limited to the configuration in which the far-side airbag 32 is sewn from the single foundation cloth. It is also appropriate to adopt a configuration in which the bag-shaped far-side airbag 32 is formed by superimposing two foundation cloths on each other and sewing peripheral edge portions thereof. Besides, the method of manufacturing the far-side airbag 32 is not limited to sewing. The far-side airbag 32 may be manufactured through, for example, a double weaving method of construction by an automatic loom (a so-called OPW method of construction).

Figure 2:
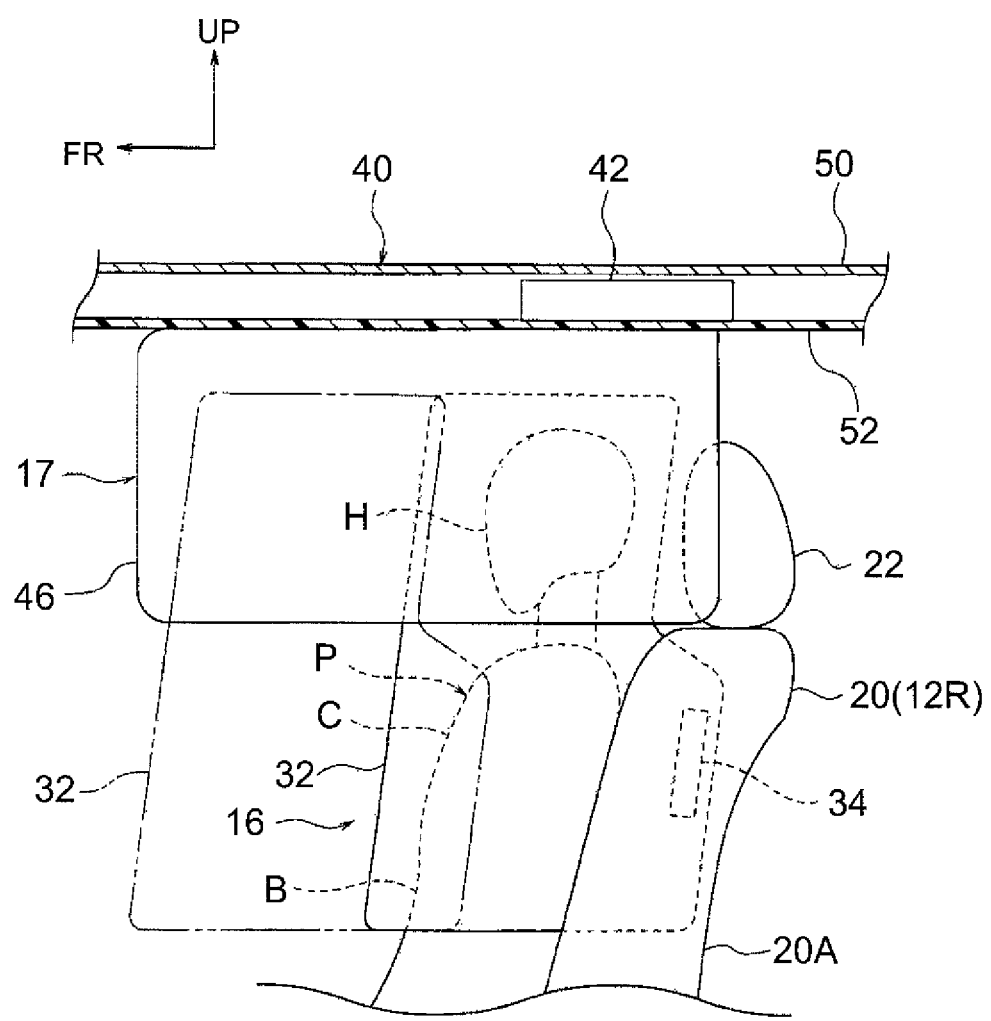
FIG. 2 is an enlarged lateral view representing a state in which the far-side airbag and the roof airbag of FIG. 1 are expanded and deployed as viewed from a vehicle width direction.

On the other hand, the inflator 34 is an inflator of, for example, a so-called cylinder type. As shown in FIG. 2, the inflator 34 is accommodated on a rear end side inside the far-side airbag 32. Although not shown in the drawing, a stud bolt that penetrates the foundation cloth of the far-side airbag 32 and a seat back frame is screwed into a nut, whereby this inflator 34 is fastened and fixed to the seat back frame together with the far-side airbag 32.

Figure 3:
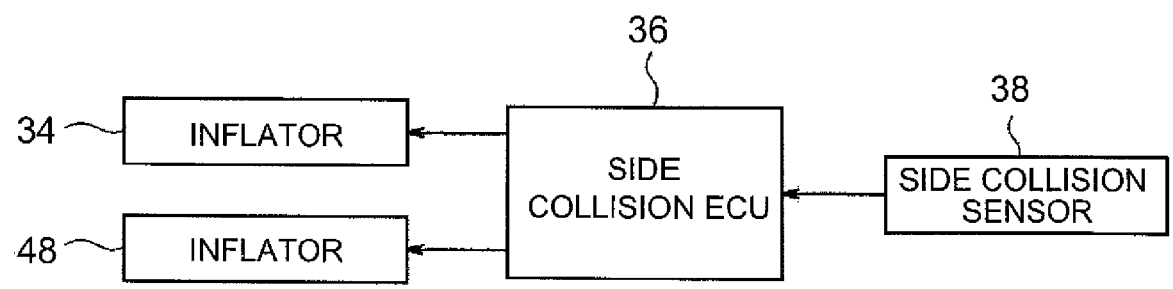
FIG. 3 is a block diagram showing a control system of the vehicular passive safety device according to the embodiment of the invention.

As shown in FIG. 3, a side collision ECU 36 (a control unit) that is mounted on the vehicle is electrically connected to this inflator 34. A side collision sensor 38 that detects a side collision of the vehicle is electrically connected to this side collision ECU 36. The side collision ECU 36 is configured to operate the inflator 34 when a side collision of the vehicle or an inevitability thereof is detected on the basis of a signal from the side collision sensor 38.

Specifically, the far-side airbag device 16 according to this embodiment of the invention is mounted on the vehicular seat 12R as a driver seat of a right-hand-drive vehicle. Therefore, when the side collision ECU 36 detects that another vehicle has collided with the lateral portion (the left-side portion) on the vehicular seat 12L side as a front passenger seat, the inflator 34 is operated. Incidentally, in the case where a pre-crash sensor that prognoses (predicts) a side collision is electrically connected to the side collision ECU 36, the inflator 34 may be configured to be operated when the side collision ECU 36 prognoses a side collision on the basis of a signal from the pre-crash sensor.

Figure 4:
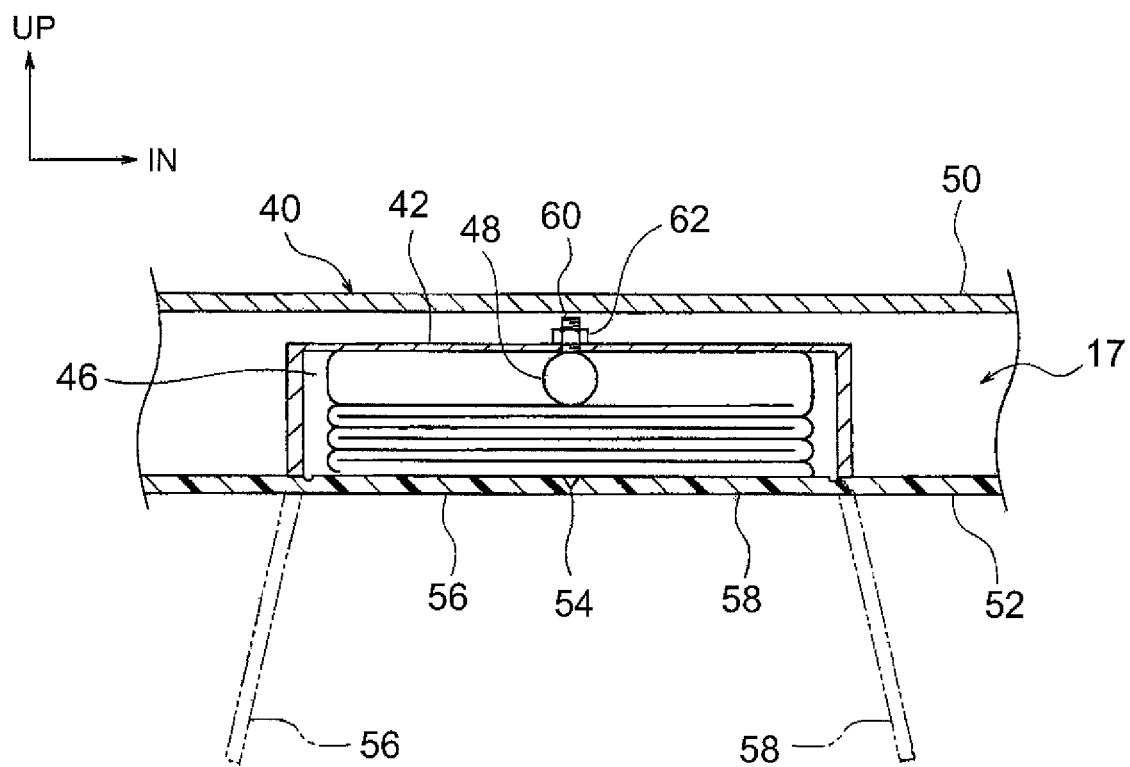
FIG. 4 is a cross-sectional view showing a configuration of a roof airbag device with which the vehicular passive safety device according to the embodiment of the invention is equipped.

On the other hand, as shown in FIG. 4, the roof airbag device 17 is equipped with an airbag case 42 that is disposed in a ceiling portion 40 of the vehicle above the console box 14, a roof airbag 46 that is accommodated in the airbag case 42 in a folded state, and an inflator 48 (a roof inflator: see FIGS. 3 and 4) that is provided in the roof airbag 46. Incidentally, in FIG. 1, the ceiling portion 40 is roughly depicted.

The airbag case 42 is arranged between a roof panel 50 and a roof head lining 52, which constitute the ceiling portion 40, at a central portion of the ceiling portion 40 in the vehicle width direction. This airbag case 42 is formed in the shape of a box with a lower end thereof being open, and is fixed to the roof panel 50 via a bracket (not shown).

Incidentally, a tear line 54 (a thin scheduled rupture portion) is formed in the roof head lining 52 at a position facing the airbag case 42. This tear line 54 is formed in the shape of, for example, H in a plan view. Thus, a pair of right and left airbag doors 56 and 58 are formed at a position of the roof head lining 52 that faces the airbag case 42.

The roof airbag 46 is modulized (unitized) together with the inflator 48, and is accommodated in the airbag case 42 in a folded state. This roof airbag 46 is formed in a bag shape by folding a single foundation cloth, which is formed by cutting out, for example, a nylon-type cloth or a polyester-type cloth, into two and sewing outer peripheral portions thereof.

Incidentally, the invention is not limited to the configuration in which the roof airbag 46 is sewn from the single foundation cloth. It is also appropriate to adopt a configuration in which the bag-shaped roof airbag 46 is formed by superimposing two foundation cloths on each other and sewing peripheral edge positions thereof. Besides, the method of manufacturing the roof airbag 46 is not limited to sewing. The roof airbag 46 may be manufactured through, for example, a double weaving method of construction by an automatic loom (a so-called OPW method of construction).

The inflator 48 is an inflator of, for example, a so-called cylinder type. As shown in FIG. 4, the inflator 48 is accommodated inside the roof airbag 46. A stud bolt 60 that penetrates the foundation cloth of the roof airbag 46 and an upper wall of the airbag case 42 is screwed into a nut 62, whereby this inflator 48 is fastened and fixed to the airbag case 42.

The aforementioned side collision ECU 36 is electrically connected to this inflator 48. This side collision ECU 36 is configured to operate the inflator 34 of the far-side airbag device 16 prior to the inflator 48 of the roof airbag device 17 when a side collision of the vehicle or an inevitability thereof is detected on the basis of a signal from the side collision sensor 38. Specifically, for example, when a predetermined time elapses after an operating current is caused to flow through the inflator 34, the side collision ECU 36 causes an operating current to flow through the inflator 48.

When the inflator 48 is operated, the gas ejected from a gas ejection port (not shown) that is provided through the inflator 48 is supplied into the roof airbag 46, so that the roof airbag 46 is expanded. Then, an expansion pressure of the roof airbag 46 is applied to the airbag doors 56 and 58, whereby the tear line 54 is ruptured, and the airbag doors 56 and 58 are laterally deployed as indicated by alternate long and two short dashes lines in FIG. 4. Thus, an opening is formed through the roof head lining 52, and the roof airbag 46 is expanded and deployed downward from the opening.

As shown in FIG. 1, the expanded and deployed roof airbag 46 abuts on the upper portion of the expanded and deployed far-side airbag 32 from inside in the vehicle width direction. In this state, the upper portion of the far-side airbag 32 that is located inside the head H of the occupant P in the vehicle width direction is interposed between the head H and the roof airbag 46. This roof airbag 46 is formed such that the lower end thereof in an expanded and deployed state is located below the lower end of the head H (the lower end of a chin) of the occupant P.

Besides, as shown in FIG. 2, this roof airbag 46 is formed in such a manner as to assume a substantially rectangular shape with a long length (a substantially oval shape) along the longitudinal direction of the vehicle, when an expanded and deployed state is viewed from the vehicle width direction. The dimension of the roof airbag 46 in the longitudinal direction of the vehicle is set sufficiently larger than the dimension of the far-side airbag 32 in an expanded and deployed state in the longitudinal direction of the vehicle. Thus, the roof airbag 46 is configured to abut on the upper portion of the far-side airbag 32 from inside in the vehicle width direction, no matter where the vehicular seat 12R is located between a front end (a frontmost position) of a slide range with respect to the vehicle body floor portion 26 and a rear end (a rearmost position) of the slide range with respect to the vehicle body floor portion 26. Incidentally, FIG. 2 shows a state in which the vehicular seat 12R (the seat cushion 18 is not shown) is located at the rearmost position. Besides, the far-side airbag 32 indicated by an alternate long and two short dashes line in FIG. 2 corresponds to a state in which the vehicular seat 12R is located at the frontmost position.

Besides, in this embodiment of the invention, the maximum internal pressure of the roof airbag 46 during expansion and deployment thereof is set substantially equal to or higher than the maximum internal pressure of the far-side airbag 32 during expansion and deployment thereof. For example, the maximum internal pressure of the roof airbag 46 during expansion and deployment thereof is set to about 150 kPa, and the maximum internal pressure of the far-side airbag 32 during expansion and deployment thereof is set to about 100 kPa.
(Operation and Effect)

Next, the operation and effect according to this embodiment of the invention will be described.

In the vehicular passive safety device 10 configured as described above, when the side collision ECU 36 detects or prognoses a side collision of the vehicle or an inevitability thereof on the basis of a signal from the side collision sensor 38, the inflator 34 of the far-side airbag device 16 and the inflator 48 of the roof airbag device 17 are operated by the side collision ECU 36. Then, the far-side airbag 32 that is accommodated in the lateral portion 20A of the seat back 20 of the vehicular seat 12R located inside in the vehicle width direction is expanded and deployed forward of the lateral portion 20A with respect to the vehicle, and the roof airbag 46 that is accommodated in the ceiling portion 40 of the vehicle is expanded and deployed downward of the ceiling portion 40.

The expanded and deployed roof airbag 46 abuts on or faces the upper portion of the expanded and deployed far-side airbag 32 from inside in the vehicle width direction. Thus, when the occupant P is restrained by the far-side airbag 32, the upper portion of the far-side airbag 32 is supported by the roof airbag 46 from inside in the vehicle width direction (on the other side of the occupant P) (see FIG. 5). Therefore, the far-side airbag 32 can be restrained from moving inward in the vehicle width direction. As a result, the occupant restraint performance by the far-side airbag 32 can be enhanced.

Moreover, in this embodiment of the invention, the roof airbag 46 supports the upper portion of the far-side airbag 32. Therefore, the capacity of the roof airbag 46 can be made smaller than in a case where the occupant P is restrained only by the roof airbag 46. Then, while the roof airbag 46 having such a small capacity is accommodated in the ceiling portion 40 of the vehicle, the far-side airbag 32 that restrains the occupant P is accommodated in the lateral portion 20A of the seat back 20 located inside in the vehicle width direction. Thus, the space in which the far-side airbag 32 is accommodated can be easily secured.

Besides, in this embodiment of the invention, when the far-side airbag 32 and the roof airbag 46 are expanded and deployed, the roof airbag 46 abuts on or faces the upper portion of the far-side airbag 32 from inside in the vehicle width direction, and the console box 14 abuts on or faces the lower portion of the far-side airbag 32 from inside in the vehicle width direction. Thus, when the occupant P is restrained by the far-side airbag 32, the upper and lower portions of the far-side airbag 32 are supported by the roof airbag 46 and the console box 14 respectively from inside in the vehicle width direction. As a result, the far-side airbag 32 can be more effectively restrained from moving inward in the vehicle width direction. Therefore, the occupant restraint performance by the far-side airbag 32 can be further enhanced.

Furthermore, in this embodiment of the invention, when the far-side airbag 32 and the roof airbag 46 are expanded and deployed, the roof airbag 46 abuts on or faces the upper portion of the far-side airbag 32, which is located inside the head H of the occupant P seated in the vehicular seat 12R in the vehicle width direction, from inside in the vehicle width direction. Thus, the upper portion of the far-side airbag 32 that restrains the head H of the occupant P can be supported by the roof airbag 46 from inside in the vehicle width direction. Therefore, the performance of restraining the head H can be enhanced.

Besides, in this embodiment of the invention, the side collision ECU 36 operates the inflator 34 of the far-side airbag device 16 prior to the inflator 48 of the roof airbag device 17. Thus, the far-side airbag 32 can be expanded and deployed prior to the roof airbag 46. It should be noted herein that a load from the occupant P is input to the far-side airbag 32 earlier than to the roof airbag 46. The far-side airbag 32 is expanded and deployed prior to the roof airbag 46 as described above, whereby the timing at which the internal pressure of the roof airbag 46 reaches its maximum can be delayed with respect to the timing at which the internal pressure of the far-side airbag 32 reaches its maximum. That is, the timings at which the load is input to the far-side airbag 32 and the roof airbag 46 can be made to coincide with the timings at which the internal pressures of the respective airbags 32 and 46 reach their maximums respectively. As a result, the far-side airbag 32 can be effectively supported by the roof airbag 46.

Furthermore, in this embodiment of the invention, the maximum internal pressure of the roof airbag 46 during expansion and deployment thereof is set higher than the maximum internal pressure of the far-side airbag 32 during expansion and deployment thereof. Thus, the reactive force that the far-side airbag 32 in an expanded and deployed state receives from the roof airbag 46 in an expanded and deployed state can be made large. Therefore, the far-side airbag 32 can be effectively supported by the roof airbag 46.

Besides, in this embodiment of the invention, the vehicular seat 12R is coupled to the vehicle body floor portion 26 slidably in the longitudinal direction of the vehicle. The dimension of the roof airbag 46 in an expanded and deployed state in the longitudinal direction of the vehicle is set larger than the dimension of the far-side airbag 32 in an expanded and deployed state in the longitudinal direction of the vehicle. Thus, a wide area of contact can be secured between the roof airbag 46 and the upper portion of the far-side airbag 32 regardless of the longitudinal slide position of the vehicular seat 12R with respect to the vehicle body floor portion 26. As a result, the far-side airbag 32 can be stably supported by the roof airbag 46.

(Supplementary Explanation of Embodiment)

In the foregoing embodiment of the invention, the inflators 34 and 48 are configured to be operated when another vehicle has collided with the lateral portion (the left-side portion) on the vehicular seat 12L side as a front passenger seat. However, the invention is not limited to this configuration. The inflators 34 and 48 may be configured to be operated when another vehicle has collided with the lateral portion (the right-side portion) on the vehicular seat 12R side. In this case, the far-side airbag 32 is configured to restrain the occupant when the occupant P has moved inward in the vehicle width direction (to a counter collision side) due to a rebound or the like after the restraint of the occupant P by a side airbag (not shown) that is provided in a lateral portion of the seat back 20 of the vehicular seat 12R located outside in the vehicle width direction. In this case, the timing at which the gas is supplied to the far-side airbag 32 may be slightly delayed with respect to the timing at which the gas is supplied to the aforementioned side airbag.

Besides, in the foregoing embodiment of the invention, the case where the vehicular seat 12R of the right-hand-drive vehicle is the vehicular seat in the invention has been described. However, the invention is not limited to this configuration. The invention is also applicable to both a vehicular seat that is disposed on the right side of a vehicle and a vehicular seat that is disposed on the left side of a vehicle.

Besides, in the foregoing embodiment of the invention, the console box 14 is configured to abut on the lower portion of the far-side airbag 32 in an expanded and deployed state from inside in the vehicle width direction. However, the invention is not limited to this configuration. The console box 14 may be configured to adjacently face the lower portion of the far-side airbag 32 in an expanded and deployed state from inside in the vehicle width direction. Besides, it is also appropriate to adopt a configuration in which the lower end of the far-side airbag 32 in an expanded and deployed state is located above the console box 14.

Besides, in the foregoing embodiment of the invention, the configuration in which the maximum internal pressure of the roof airbag 46 during expansion and deployment thereof is set higher than the maximum internal pressure of the far-side airbag 32 during expansion and deployment thereof is adopted. However, the invention is not limited to this configuration. The aforementioned relationship between the maximum internal pressures can be appropriately changed.

Besides, in the foregoing embodiment of the invention, the side collision ECU 36 (the control unit) is configured to operate the inflator 48 of the roof airbag device 17 prior to the inflator 34 of the far-side airbag device 16. However, the invention is not limited to this configuration. The timings at which the inflators 34 and 48 are operated can be appropriately changed. For example, it is also appropriate to adopt a configuration in which the inflator 34 and the inflator 48 are operated at the same time.

Besides, in the foregoing embodiment of the invention, in the case where the ceiling portion 40 is provided with a sun roof 64 (see FIG. 6), it is also appropriate to adopt a configuration in which the expanded and deployed roof airbag 46 extends across the sun roof 64 in the longitudinal direction of the vehicle, and a two-forked bifurcation portion 46A is provided at a front portion of the roof airbag 46. This bifurcation portion 46A contacts a lower face of the ceiling portion 40 in front of the sun roof 64 with respect to the vehicle, whereby the roof airbag 46 can be stably supported.

Furthermore, the invention can be carried out after being altered in various manners without departing from the gist thereof. Besides, as a matter of course, the scope of the invention is not limited to the foregoing embodiment thereof.

What is claimed is:

1. A vehicular passive safety device comprising:
    a vehicular seat including a seat cushion and a seat back;
    a far-side airbag device having a far-side airbag that is accommodated in a lateral portion of the seat back located inside in a vehicle width direction, the far-side airbag being supplied with a gas from a far-side inflator upon detection or prognosis of a side collision, and the far-side airbag being expanded and deployed forward of the lateral portion with respect to a vehicle; and
    a roof airbag device having a roof airbag that is accommodated in a ceiling portion of a vehicle body, the roof airbag being supplied with a gas from a roof inflator upon detection or prognosis of a side collision, and being expanded and deployed downward with respect to the ceiling portion, wherein:
    the expanded and deployed roof airbag includes a lower portion that supports an upper portion of the expanded and deployed far-side airbag from inside in the vehicle width direction.

2. The vehicular passive safety device according to claim 1, further comprising:

a center console box that is provided inside the vehicular seat in the vehicle width direction, wherein the center console box abuts on or faces a lower portion of the far-side airbag from inside in the vehicle width direction, when the far-side airbag is in an expanded and deployed state.

3. The vehicular passive safety device according to claim 1, wherein the upper portion of the far-side airbag is configured to be located inside a head of an occupant seated in the vehicular seat in the vehicle width direction, when the far-side airbag is in an expanded and deployed state.

4. The vehicular passive safety device according to claim 1, further comprising:

a control unit that operates the far-side inflator of the far-side airbag device prior to the roof inflator of the roof airbag device.

5. The vehicular passive safety device according to claim 1, wherein a maximum internal pressure of the roof airbag during expansion and deployment thereof is equal to or higher than a maximum internal pressure of the far-side airbag during expansion and deployment thereof.

6. The vehicular passive safety device according to claim 1, wherein the vehicular seat is coupled to a vehicle body floor portion slidably in a longitudinal direction of the vehicle, and a dimension of the roof airbag in an expanded and deployed state in a longitudinal direction of the vehicle is larger than a dimension of the far-side airbag in an expanded and deployed state in the longitudinal direction of the vehicle.

7. The vehicular passive safety device according to claim 1, further comprising:

a side airbag that is provided in a lateral portion of the seat back of the vehicular seat located outside in the vehicle width direction; and a control unit that operates inflators of each airbag device, wherein the control unit controls a first timing at which a gas is supplied to the far-side airbag and a second timing at which the gas is supplied to the side airbag, and the first timing is delayed with respect to the second timing.

8. The vehicular passive safety device according to claim 1, wherein the expanded and deployed roof airbag extends across a sun roof in a longitudinal direction of the vehicle, and a two-forked bifurcation portion is provided at a front portion of the roof airbag.

9. The vehicular passive safety device according to claim 8, wherein the two-forked bifurcation portion contacts a lower face of the ceiling portion in front of the sun roof with respect to the vehicle.

10. The vehicular passive safety device according to claim 1, wherein a lower end of the roof airbag is configured to be located below a lower end of a head of an occupant seated in the vehicular seat, when the roof airbag is in an expanded and deployed state.

11. The vehicular passive safety device according to claim 1, wherein a dimension of an upper end of the far-side airbag in an expanded and deployed state in the vehicle width direction is larger than a dimension of a lower end of the far-side airbag in the expanded and deployed state in the vehicle width direction.

12. The vehicular passive safety device according to claim 1, wherein the expanded and deployed roof airbag does not extend below a top of the seat back.

* * * * *